US007706362B1

(12) United States Patent
Senthilnathan et al.

(10) Patent No.: US 7,706,362 B1
(45) Date of Patent: Apr. 27, 2010

(54) METHOD AND APPARATUS FOR SELECTION OF AN ENDPOINT DEVICE IN A POINT TO POINT LINK

(75) Inventors: Janakiraman Senthilnathan, Mount Prospect, IL (US); Rohit Verma, Schaumburg, IL (US); Amit Tiwari, Schaumburg, IL (US); Ashwin Hegde, Arlington Heights, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/430,267

(22) Filed: Oct. 29, 1999

(51) Int. Cl.
*H04L 12/28* (2006.01)
(52) U.S. Cl. ...................................... 370/389; 455/436
(58) Field of Classification Search ................. 709/230, 709/232, 223, 238, 242, 249
See application file for complete search history.

(56) References Cited

U.S. PATENT DOCUMENTS

| 5,426,637 | A | * | 6/1995 | Derby et al. | ............. | 370/85.13 |
| 5,528,595 | A | | 6/1996 | Walsh et al. | ............. | 370/85.13 |
| 6,449,272 | B1 | * | 9/2002 | Chuah et al. | ................ | 370/389 |
| 6,522,880 | B1 | * | 2/2003 | Verma et al. | ................ | 455/436 |
| 2002/0176414 | A1 | * | 11/2002 | Miki et al. | ................... | 370/389 |

FOREIGN PATENT DOCUMENTS

WO    WO 92/12587    *    7/1992

OTHER PUBLICATIONS

Zorn, Leifer et al., "RADIUS Attributes for Tunnel Protocol Support", *Network Working Group, Internet Draft*, <draft-ietf-radius-tunnel-auth-07.txt>, Jun. 1999, pp. 1-19.

Townsley, W. et al., "Layer Two Tunneling Protocol (L2TP)", *Network Working Group, Request for Comments* 2661, Aug. 1999, pp. 1-80.

Deering, S. et al., "Host Extensions for IP Multicasting", *Network Working Group, Request for Comments* 1112, Aug. 1989, pp. 1-17.

Fenner, W. et al., "Internet Group Management Protocol, Version 2", *Network Working Group, Request for Comments* 2236, Nov. 1997, pp. 1-24.

* cited by examiner

*Primary Examiner*—Dang Ton
*Assistant Examiner*—Robert W. Wilson
(74) *Attorney, Agent, or Firm*—McDonnell Boehnen Hulbert & Berghoff

(57) ABSTRACT

A method is shown for deterministically selecting an endpoint for multiple links through a network for a client device. When a first network device establishes a connection for a client device to an endpoint device, it causes a database entry to be created that is keyed by a client identifier value for the client device and includes an endpoint address field with the network address of the endpoint device. When a second network device receives a call request from the client device, it queries the database using the client identifier value for the client device and waits a predetermined period for a database reply. A database device storing the database entry receives the query from the second network device, searches for the database entry matching the client identifier value, and sends a database reply that includes the client identifier value and the network address of the endpoint device from the database entry. The second network device receives the database reply and uses the network address from the database reply to establish a second connection to the endpoint device for the client.

9 Claims, 11 Drawing Sheets

METHOD AND APPARATUS FOR SELECTION OF AN ENDPOINT DEVICE IN A POINT TO POINT LINK

FIELD OF INVENTION

The present invention relates to data communications. More specifically, it relates to the transmission of packets in a point to point communication link.

BACKGROUND OF THE INVENTION

Connection oriented point-to-point communication links, such as a Layer 2 Tunneling Protocol (L2TP) tunnel, are an increasingly common feature of network infrastructures. Tunnels are prearranged connections established by agreement between interne service providers (ISPs). See Request for Comment (RFC) 2661 and Layer Two Tunneling Protocol (L2TP), A. Valencia, et al., draft-ietf-pppext-12p-16.text, June 1999, herein incorporated by reference, available from the Internet Engineering Task Force (IETF) at World Wide Web.ietf.org for more information. FIG. 1 shows an architecture 10 that illustrates two L2TP tunnels 56 and 66 established through a public IP network 70. Each L2TP tunnel is a pre-arranged point to point link between remote client 20 and server 80.

An L2TP tunnel provides a conduit for communications between a remote client 20 and a server 80. Typically, a single tunnel slot provides the communication link between a client and server. However, it is increasingly common for there to be multiple tunnels providing the client-server communication link. For example, Multi-Link Point-to-Point (MLPPP) connections aggregate the bandwidth of multiple tunnel connections to provide a single higher bandwidth communication link. Also, in wireless mobile applications, a second tunnel link may be established from a tunnel initiator in the cell area that the client is entering while a first tunnel link still exists from the tunnel initiator in the cell area that the client is leaving. It is advantageous in such multiple link connections to have each link terminate on the same tunnel endpoint. However, there is no conventional way to deterministically select the endpoint for a given L2TP tunnel.

When remote client 20 establishes a dial-up connection 22 or 24 with a tunnel initiator (TI) 30 or 40, then the TI typically recognizes client 20 as a tunnel client by means of an authentication protocol, such as RADIUS, see Request For Comment (RFC) 2138, herein incorporated by reference, or other means for identifying the client. Typically, each TI has a table that indicates the endpoint for the tunnel connection for client 20. The table in each TI typically includes a list of tunnel endpoints (TEs), such as 50 and 60 for each remote client and each TI selects an endpoint from the list independent of the selection made by another TI. Similarly, TI 40 will have a table that indicates a list of endpoints for client 20. When client 20 connects to TI 30 or 40, then each TI will independently select a TE device. As a result, there is a high likelihood that the two tunnel connections 56 and 66 will terminate on different tunnel endpoint devices, as is shown in FIG. 1.

Thus, the need remains for a method for terminating tunnels initiated on multiple tunnel initiators on a common tunnel endpoint.

SUMMARY OF THE INVENTION

In accordance with preferred embodiments of the present invention, some of the problems associated with routing multiple communication links to the same endpoint are overcome.

An embodiment of a method, according to the present invention, for determining an endpoint in a communications system includes receiving a connection request from a client and, responsive to the connection request, querying a database for a database entry matching the client using predetermined identifying information, where the matching database entry will include an identifier for an endpoint. Responsive to receiving a database reply including the identifier for the endpoint, the method then sets forth establishing a connection for the client to the endpoint identified in the database reply. Alternatively, responsive to not receiving a database reply, the method calls for establishing a connection for the client to a locally determined endpoint, and updating the database to include a database entry that includes the predetermined identifying information for the client and an identifier for the locally determined endpoint.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein.

DETAILED DESCRIPTION OF PREFERRED EMBODIMENTS

The present invention is directed toward a method for terminating multiple tunnel connections on a common tunnel endpoint.

Figure 1:
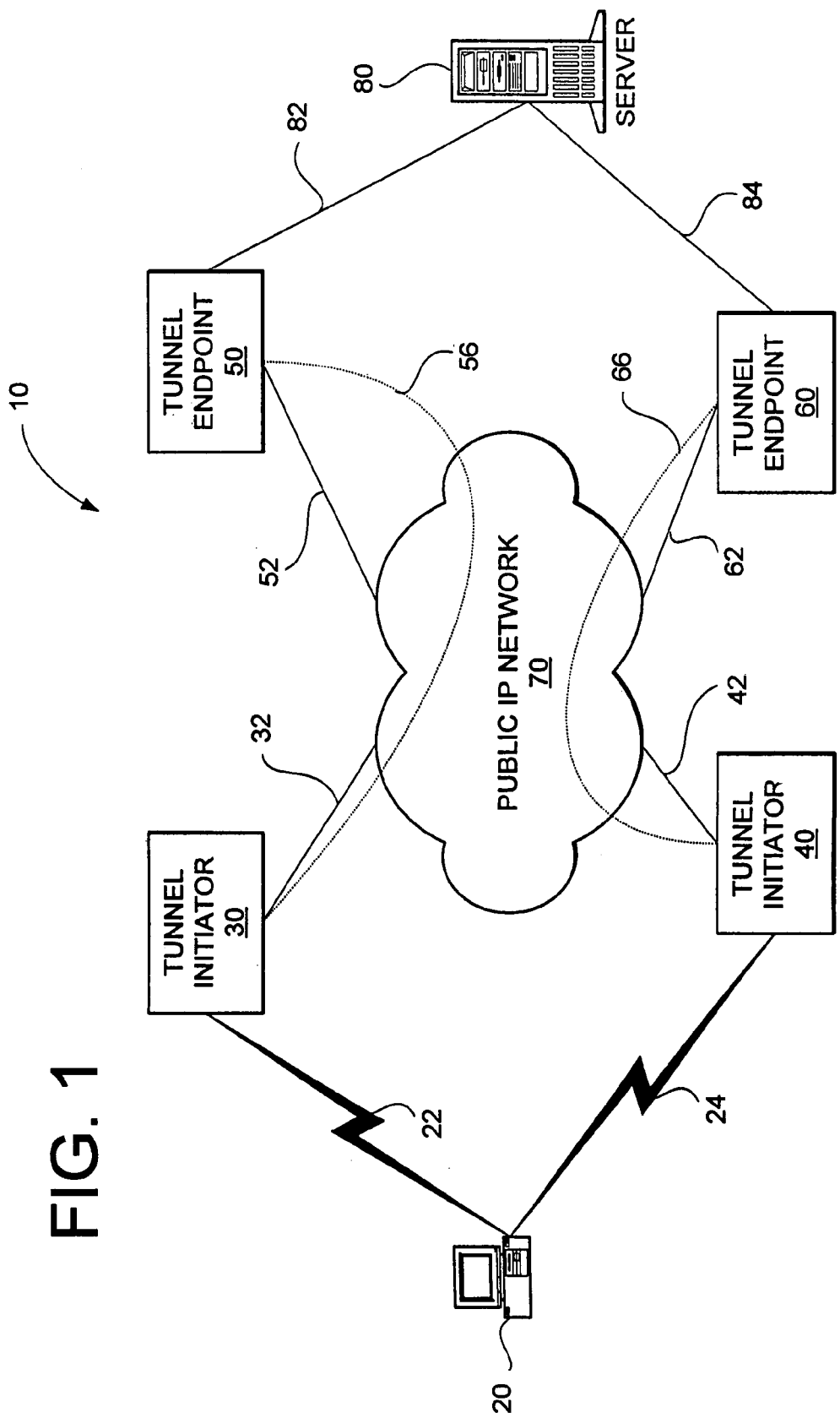
FIG. 1 is a functional block diagram illustrating a network architecture having two prearranged tunnel connections that terminate on different endpoint devices.
Figure 2:
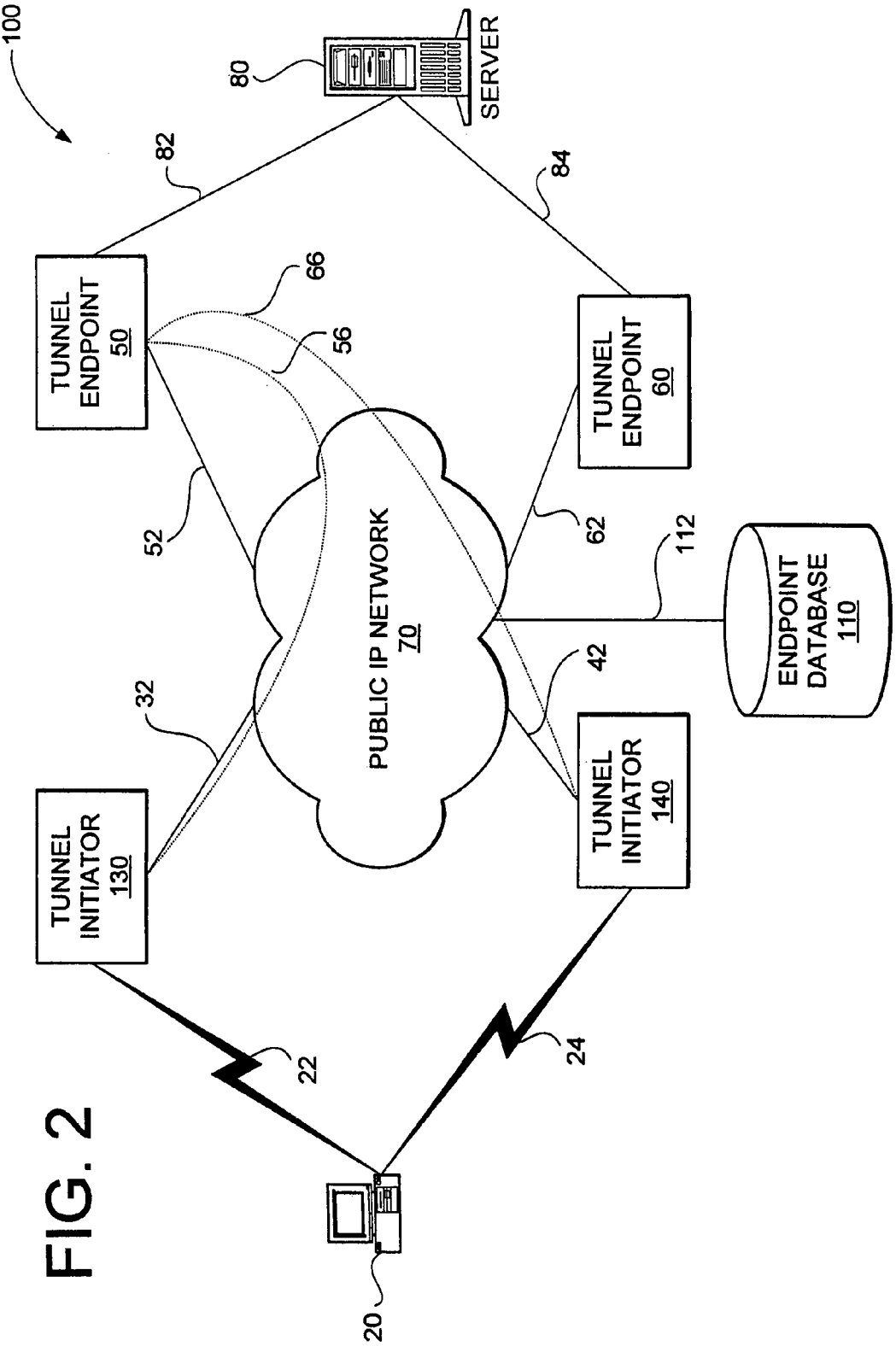
FIG. 2 is a functional block diagram illustrating a network architecture according to an embodiment of the present invention having two prearranged tunnel connections that terminate on a single endpoint device, where a database device is directly coupled to the network.

FIG. 2 is a block diagram illustrating a network architecture 100 suitable for use with the present invention. Architecture 100 includes a database 110 linked to IP network 70 for storing tunnel endpoint information for tunnel connections established for remote clients. Tunnel Initiators 130 and 140 are adapted to follow a protocol according to the present invention that requires the TIs to consult database 110 before establishing a call to a tunnel endpoint.

One example of a tunnel initiator device is a network access server, such as that described in the patent to Dale M. Walsh et al., U.S. Pat. No. 5,525,595, which is fully incorporated by reference herein and describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Ascend Communications, Livingston Enterprises, Multitech, and others. The invention is suitable for implementation in network access servers from the above companies, and other similar devices.

According to the protocol of the present invention, a TI will send an IP multicast-based query to database 110 that includes an <EDO, Username> pair. An Endpoint Discriminator (EDO) is a unique identifier for a device, such as a central processor unit identifier (CPUid) or a Medium Access Control (MAC) address. The Username is a value registered with a target Remote Access Server (RAS).

The IP multicast message will have a predetermined message type that uniquely identifies it as a database query in accordance with the present invention. IP multicasting is the transmission of an IP datagram to a "host group", a set of zero or more hosts identified by a single IP destination address. A multicast datagram is delivered to all members of its destination host group with the same "best-efforts" reliability as regular unicast IP datagrams, i.e., the datagram is not guaranteed to arrive intact at all members of the destination group or in the same order relative to other datagrams. The membership of a host group is dynamic; that is, hosts may join and leave groups at any time. There is no restriction on the location or number of members in a host group. A host may be a member of more than one group at a time and a host need not be a member of a group to send datagrams to it.

A host group may be permanent or transient. A permanent group has a well-known, administratively assigned IP address. It is the address, not the membership of the group, that is permanent; at any time a permanent group may have any number of members, even zero. Those IP multicast addresses that are not reserved for permanent groups are available for dynamic assignment to transient groups which exist only as long as they have members. See RFC 1112 and RFC 2236 for further information regarding IP multicasting.

Database 112 will contain tuples having a format <EDO, Username, EP>, where EP is the endpoint address for a tunnel endpoint corresponding to the EDO and Username values.

Responsive to the query, database 110 will return a message indicating failure, i.e. no tuple was found matching the EDO and Username values, or success. A success message will include the value of EP from the matching tuple in database 110.

Figure 3:
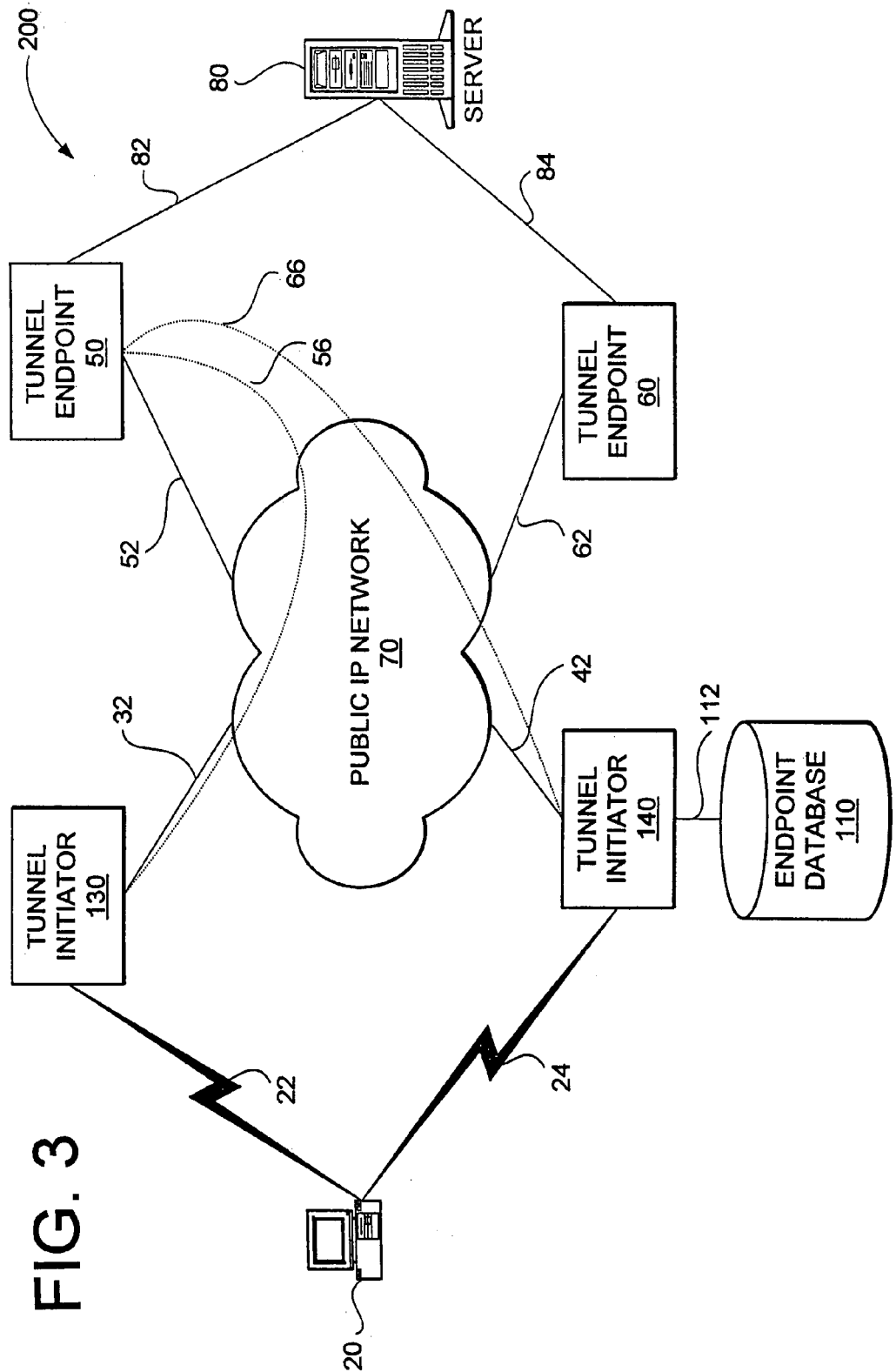
FIG. 3 is a functional block diagram illustrating another network architecture according to an embodiment of the present invention, where the database is locally connected to a tunnel initiator.
Figure 4:
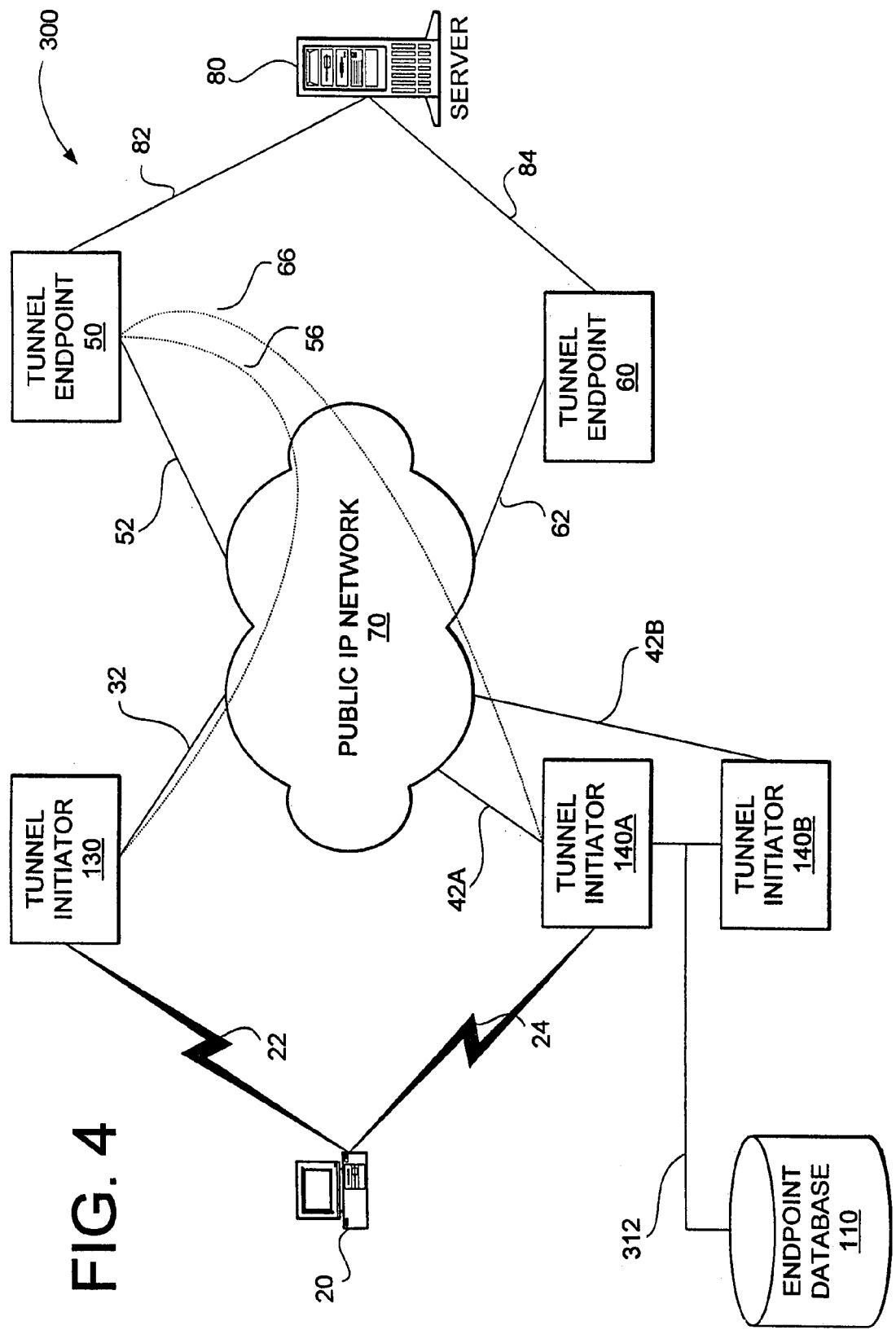
FIG. 4 is a functional block diagram illustrating yet another network architecture according to an embodiment of the present invention, where the database is locally shared to a cluster of tunnel initiators.

Note that while database 110 is shown as an entity connected to network 70, the database may reside elsewhere relative to the tunnel initiator. For instance, database 110 can also reside locally on a tunnel initiator, as reflected in another embodiment of a network architecture 200 illustrated in FIG. 3. Or, the tunnel initiator 140A may be part of a cluster of tunnel initiators 140A and 140B connected via a local network 312 where the database 110 is coupled to the tunnel initiators through the local network 312, as reflected in yet another embodiment of a network architecture 300 illustrated in FIG. 4.

The use of IP multicasting permits the location of database 110 to be transparent to the protocol according to the present invention since the multicast message is universally broadcast and will therefore be received by the database regardless of where it is located. Also, multicasting allows database 110 to be distributed across multiple devices, since multicasting provides for the handling of multiple replies to a multicast message by discarding extraneous replies.

Figure 5:
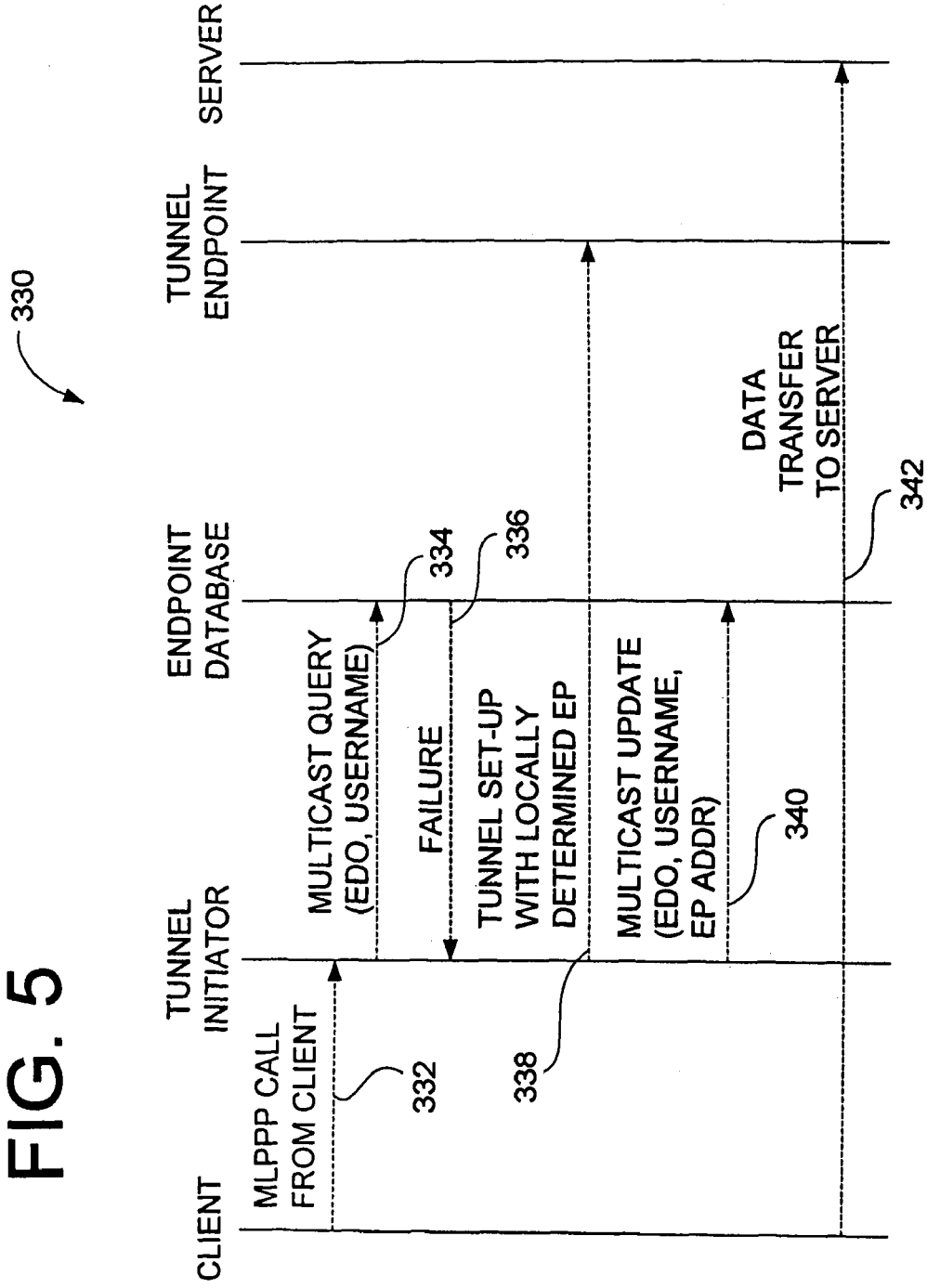
FIG. 5 is a message sequence scenario illustrating an example of message traffic according to an embodiment of the present invention when a client call is received for which there is no database entry.

FIG. 5 illustrates a first scenario 330 that illustrates a sequence of messages according to the present invention that occur as a result of a request for the establishment of a first link of a tunnel, such as client 20 might send to tunnel initiator 30 over link 22. In scenario 330, each vertical line represents one or more entities, such as those that appear in FIGS. 2, 3 and 4. For example, CLIENT corresponds to client 20, TUNNEL INITIATOR corresponds to tunnel initiator 130, 140, 140A or 140B, ENDPOINT DATABASE corresponds to endpoint database 110, TUNNEL ENDPOINT corresponds to tunnel endpoint 50 or 60, and SERVER corresponds to server 80. One of ordinary skill in the art will readily recognize that the present invention may be applied to other configurations without departing from the teachings of the present invention.

In FIG. 5, a multi-link point-to-point (MLPPP) call 332 from a client to a tunnel initiator causes the tunnel initiator to generate a multicast query 334 containing an EDO and USERNAME that identifies the client. The endpoint database receives the query and searches the database for a tuple having key attribute values that match the EDO and USERNAME. In scenario 330, this is the first link for the client, so no tuple exists and the endpoint database returns a FAILURE message 336. Alternatively, the FAILURE message 336 may be sent when the endpoint database finds that an EP ADDR field for the matching tuple is a null value indicating that no connections exist for the client.

In a multicast based alternative, the FAILURE message 336 is not sent and the endpoint database discards the query message. In the multicast alternative, the tunnel initiator retransmits the query a predetermined number of times, or times-out, and, based on the absence of a response, determines that no matching tuple exists. A multicast-based embodiment of the present invention is described in greater detail below with respect to FIG. 8.

Once the tunnel initiator determines that no other link exists for the client, it sends a tunnel set-up message 338 to a locally determined tunnel endpoint. Once the tunnel is established, the tunnel initiator multicast a database update message 340 containing the EDO and USERNAME values for the client and the EP ADDR value for the tunnel endpoint. The endpoint database receives the update message 340 and stores the information in the matching tuple in the database. A first tunnel link is now in place for data transfer 342 from the client to the server.

Figure 6:
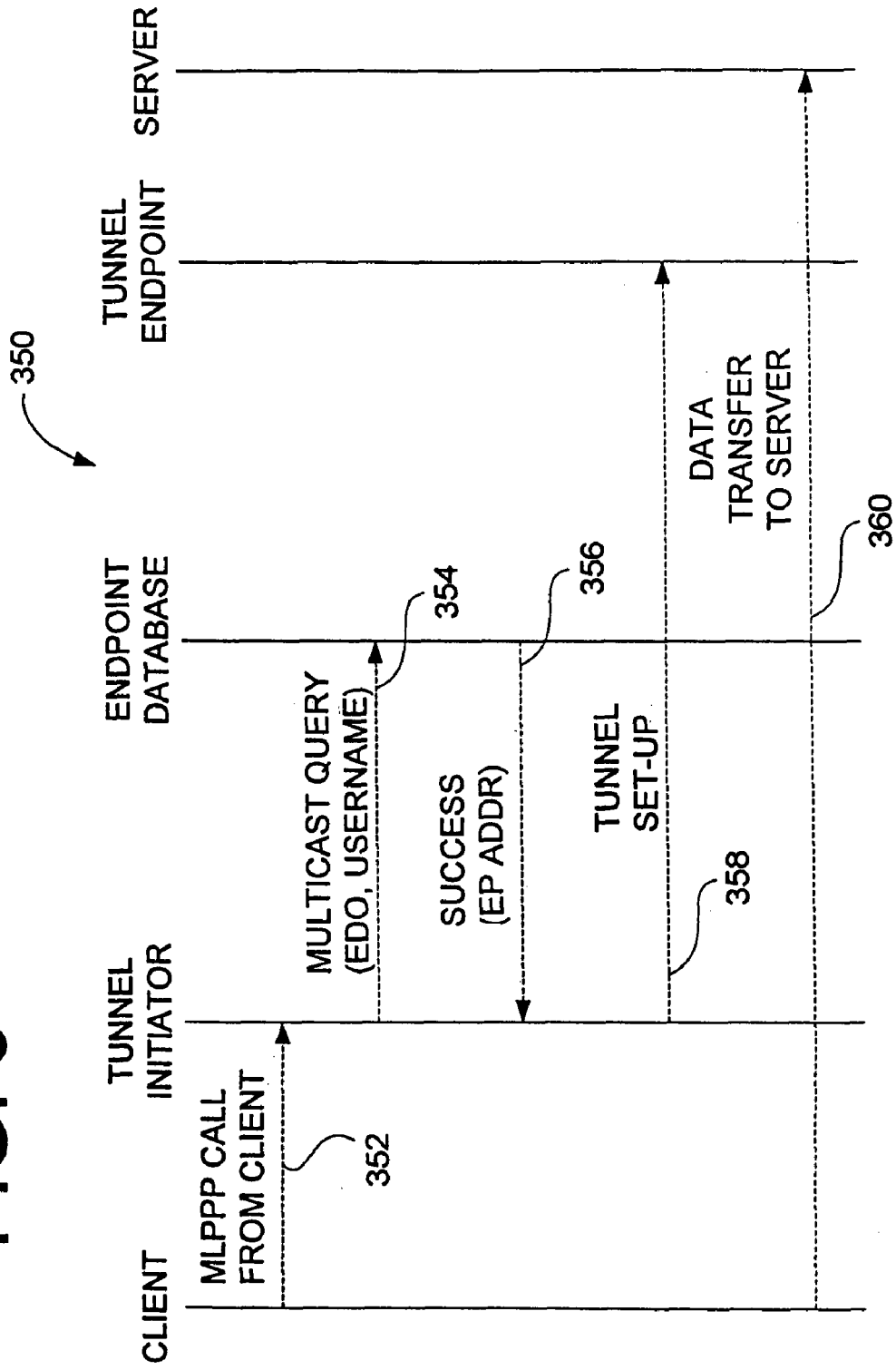
FIG. 6 is a message sequence scenario illustrating an example of message traffic according to an embodiment of the present invention when a client call is received and there is a matching database entry.

FIG. 6 illustrates a scenario 350 where the same client requests a second tunnel link via MLPPP call 352. This time, database query 354 results in the endpoint database finding the matching tuple that contains the EP ADDR of the tunnel endpoint for the first link. The endpoint database returns the EP ADDR in a success message 356 to the tunnel initiator. The tunnel initiator then uses the EP ADDR from message 356 to send tunnel set-up message 358 to the tunnel endpoint corresponding to the value of EP ADDR. This establishes a second link of a MLPPP connection between the tunnel initiator and the tunnel endpoint and the multi-link connection is now in place for data transfer 360 between the client and server.

Figure 7:
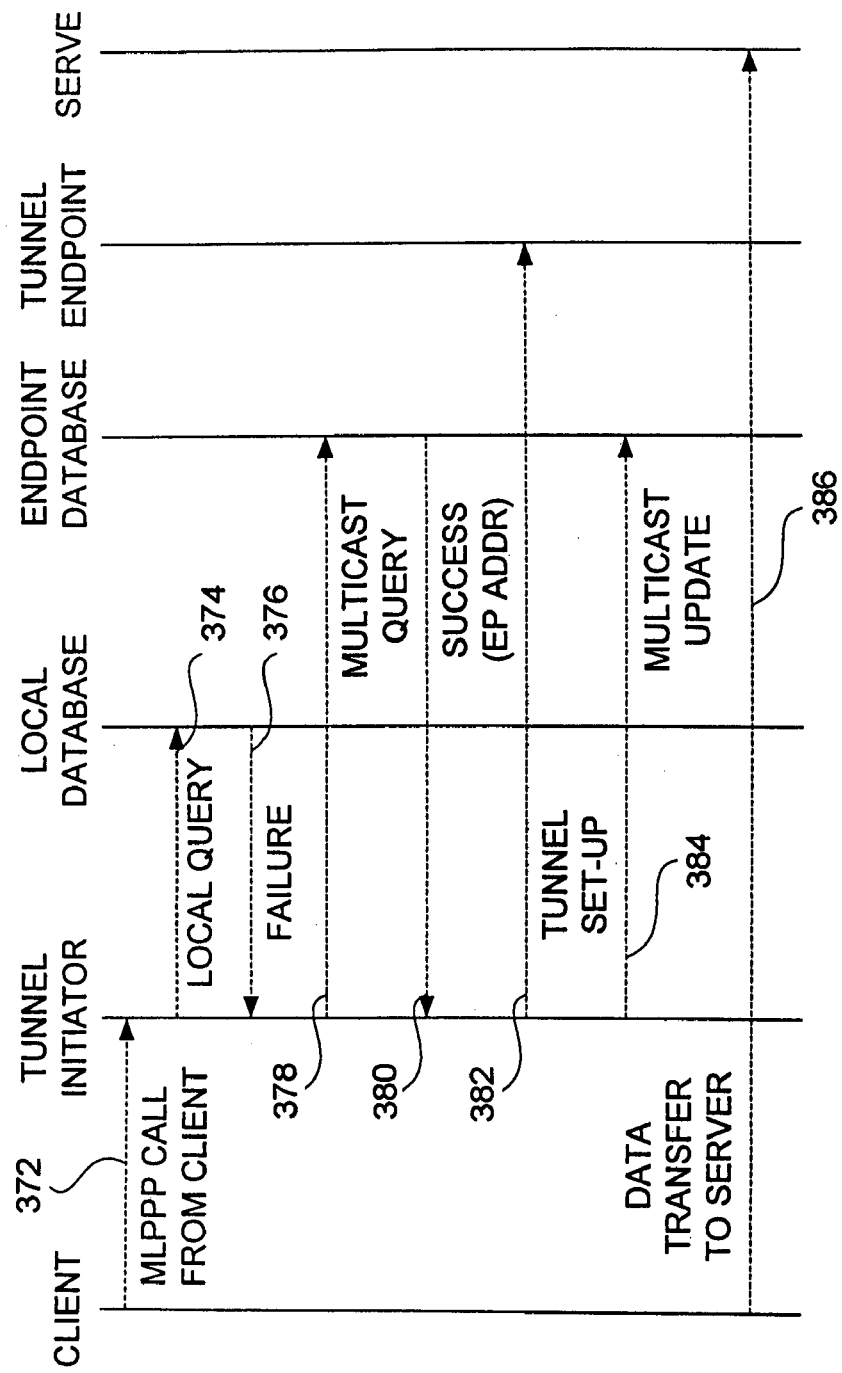
FIG. 7 is a message sequence scenario illustrating an example of message traffic according to an embodiment of the present invention based upon multicasting when a client call is received and there is a matching database entry.

Alternatively, the tunnel initiator according to the present invention can be configured to check a local database for the matching tuple for the client EDO and USERNAME values before sending a multicast query. Messaging scenario 370 of FIG. 7 illustrates an example of the message flow for such a tunnel initiator.

In response to a MLPPP call 372 from the client, the tunnel initiator sends a local query 374 that contains the EDO and USERNAME for the client. The local database can be resident upon the tunnel initiator, on another tunnel initiator in the same cluster, or otherwise locally accessible by the tunnel initiator receiving the MLPPP call 372. If the local database does not find a matching tuple, then it returns a failure message 376 to the tunnel initiator which then sends out the multicast query 380 to obtain the EP ADDR value from an endpoint database residing elsewhere in the network.

Once the tunnel for the connection is set-up via message 382, a multicast update 384 updates the non-resident endpoint database. However, the local database can also be updated so that another call set-up request from the client that is received by the tunnel initiator will result in the local query being successful.

Figure 8:
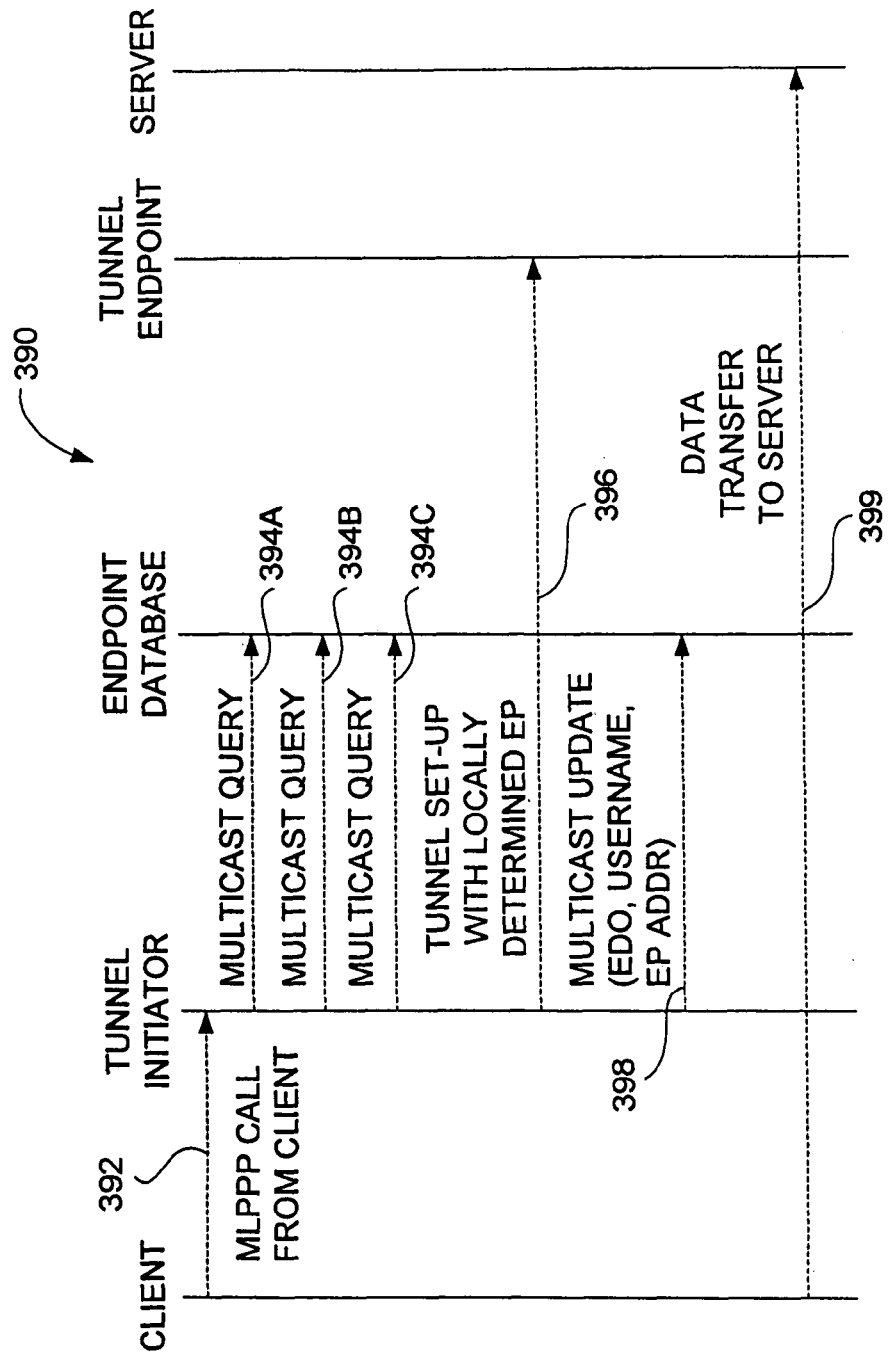
FIG. 8 is a message sequence scenario illustrating an example of message traffic according to an embodiment of the present invention based upon repeated multicasting when a client call is received and there is no matching database entry.
Figure 9:
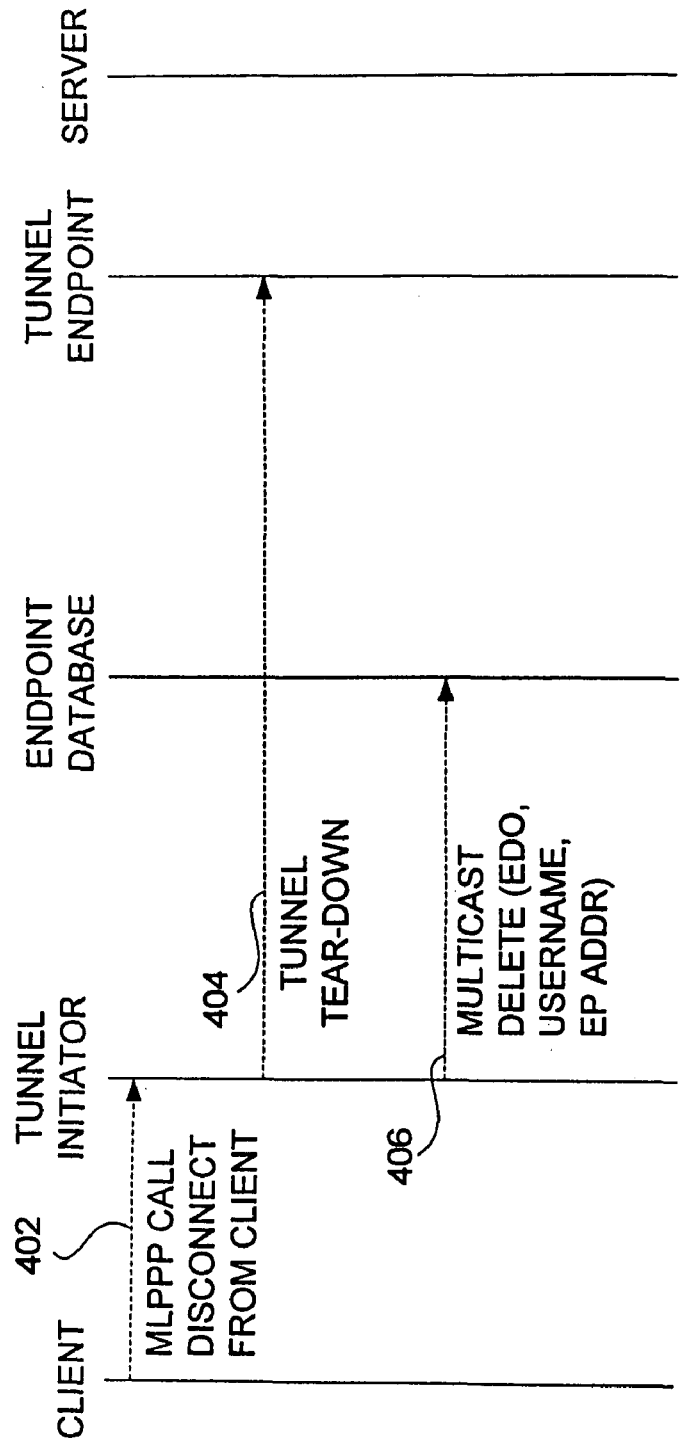
FIG. 9 is a message sequence scenario illustrating an example of message traffic according to an embodiment of the present invention when a call is disconnected.

FIG. 8 illustrates an embodiment of the protocol according to the present invention that is based upon UDP multicasting. In the FAILURE response based approach of FIG. 7, problems can arise if requests for two links from the same client are pending at the same time. Each request can receive a FAILURE message and each tunnel initiator will locally select a tunnel endpoint, which may well result in two separate tunnel endpoints being selected.

In a multicast-based approach, each tunnel initiator retransmits a multicast query a predetermined number of times without receiving a response before concluding that no tunnel endpoint is determined for the client. If one tunnel initiator reaches its maximum number of retransmissions without a response before the other, then it will locally select a tunnel endpoint and update the tunnel endpoint table with its selection. When the other tunnel initiator retransmits its query, it will receive a reply based upon the information in the first tunnel initiator's update.

To be compatible with UDP multicasting, each server that hosts an endpoint database or a portion thereof must be configured to silently discard a multicast query for which it has no matching tuple. In scenario 390 of FIG. 8, the tunnel initiator, in response to MLPPP call 392, generates a predetermined number of multicast queries 394A, 394B and 394C. The tunnel initiator waits a predetermined time period for a response after each query attempt.

When no response is received after the last query 394C is sent, then the tunnel initiator determines that no tuple exists in the endpoint database, or databases, and proceeds to establish the tunnel connection using a locally determined tunnel endpoint. The tunnel initiator then sends out a multicast update 398 that updates the endpoint database or databases. With multiple databases, a subsequent multicast query with the clients EDO and USERNAME values will result in multiple responses. The tunnel initiator is configured to accommodate multiple responses by discarding the extraneous responses.

Figure 10:
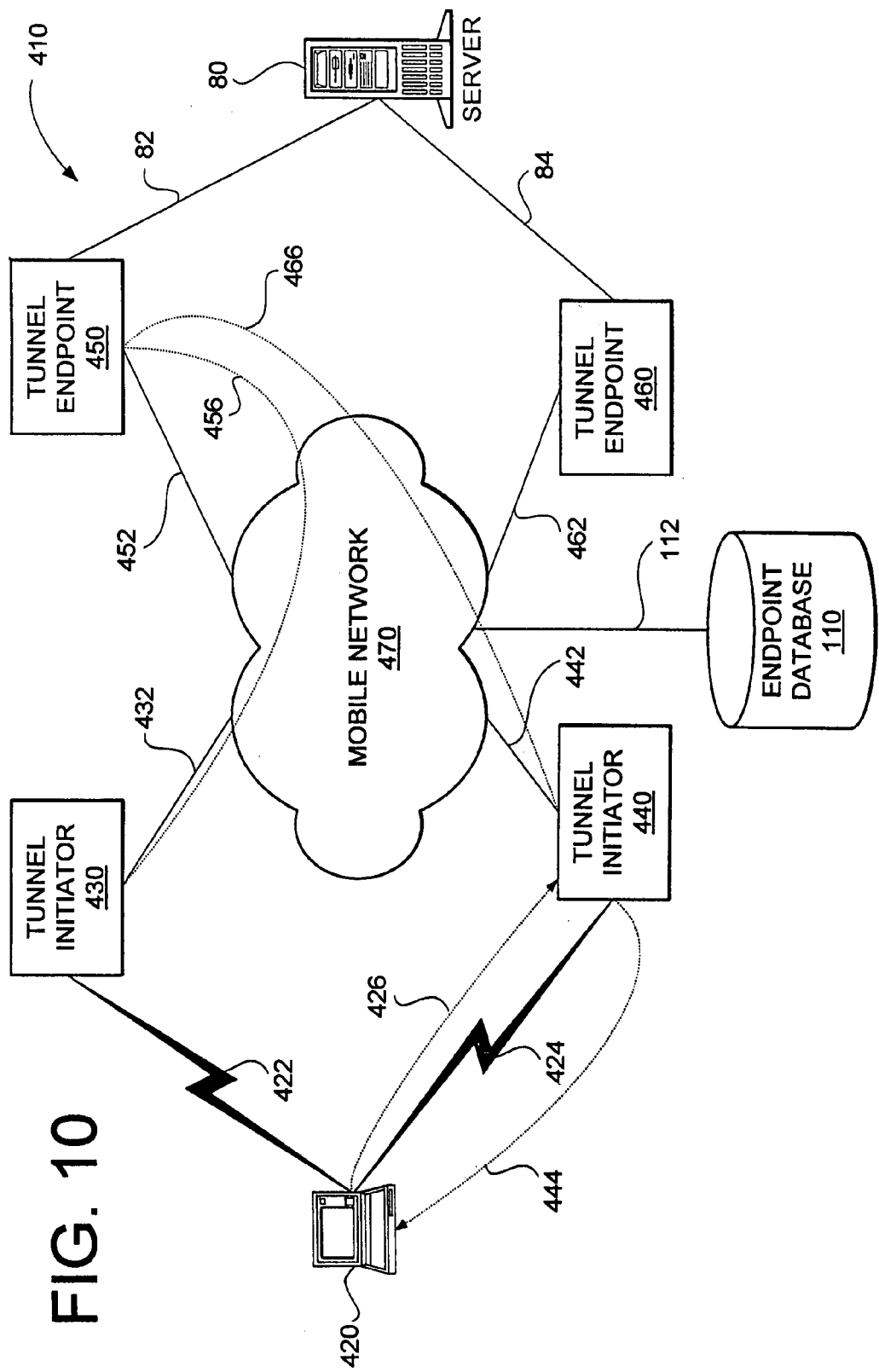
FIG. 10 is a functional block diagram illustrating a mobile network architecture according to an embodiment of the present invention.

The protocol according to the present invention can also be applied to mobile networks, as mentioned above. FIG. 10 shows an embodiment of a mobile architecture 410 that illustrates the application of the present invention to mobile communications. Mobile client 420 has a wireless connection 422 to tunnel initiator 430, which is, for example, a cell site. Tunnel initiator 432 has established a connection 432 to tunnel endpoint 450 in order to communicate with server 80.

However, when mobile user 420 leaves the service area for tunnel initiator 430, another link 424 must be established with the tunnel initiator 440 for the service area that the mobile user is entering. It is advantageous to terminate the tunnel connection for link 424 to the same tunnel endpoint 450 as terminates tunnel connection 456 for link 422.

In mobile IP, mobile user 420 typically senses that it has lost contact with tunnel initiator 430 when it times out waiting for an advertisement message from tunnel initiator 430. Mobile user 420 will then look for an advertisement message 444 from a new foreign agent, tunnel initiator 440. When mobile user 420 receives advertisement message 444, it sends a registration message 426 that initiates set-up of link 424 and set-up of tunnel connection 466. See RFC 2002 for further details regarding mobile IP.

Figure 11:
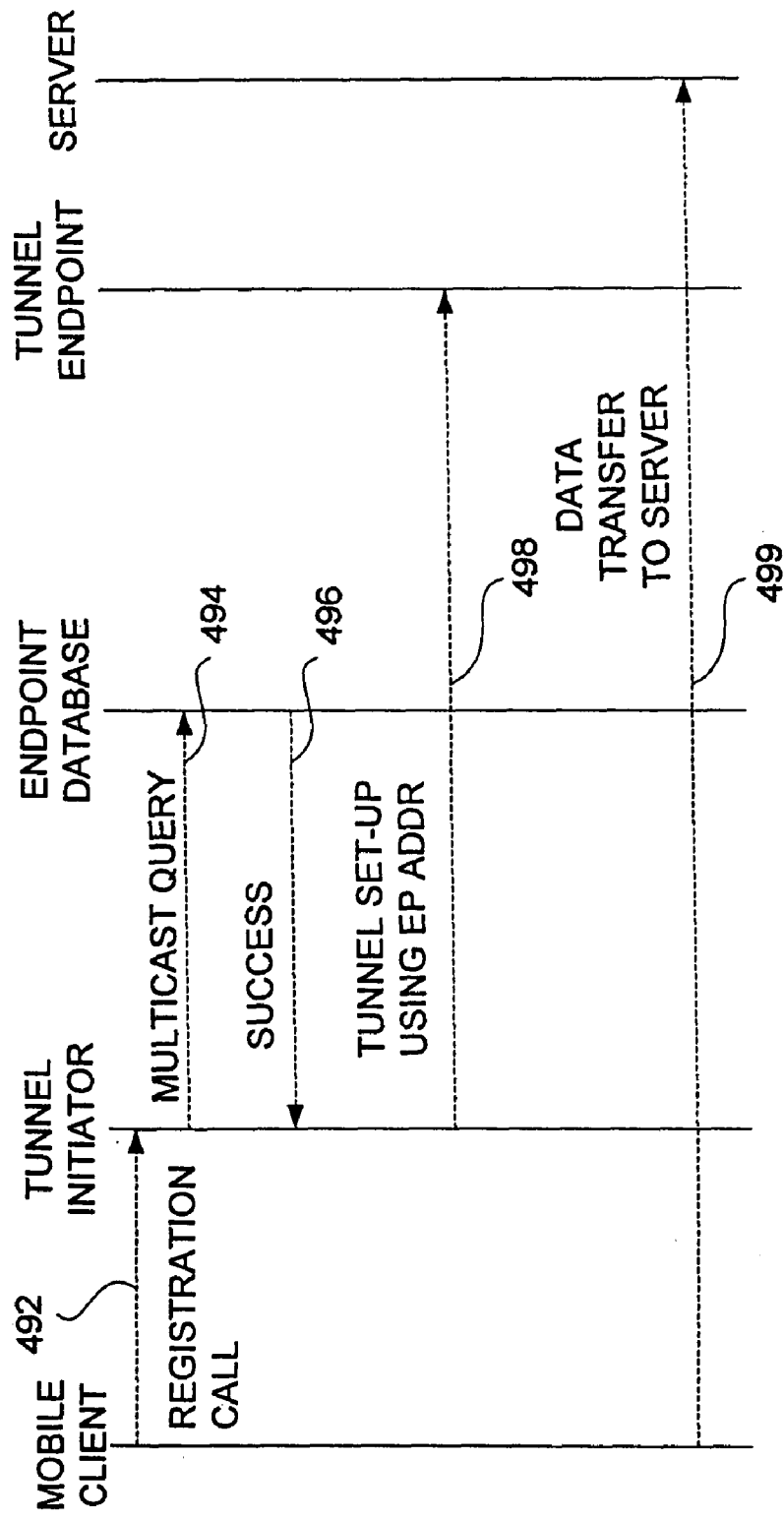
FIG. 11 is a message sequence scenario illustrating an example of message traffic according to an embodiment of the present invention based upon multicasting when a client call from a mobile client is received and there is a matching database entry.

When tunnel initiator 440 receives the registration message 426, it follows the protocol according to the present invention in establishing tunnel connection 466 to tunnel endpoint 450. FIG. 11 illustrates a scenario 490 for the protocol as applied to the mobile network architecture 410 of FIG. 10. The registration call, 426 in FIGS. 10 and 492 in FIG. 11, prompts tunnel initiator 440 to broadcast database query 494 containing the EDO and USERNAME of mobile user 422. Endpoint database 110 receives the query and searches for a matching tuple. A matching tuple with the EDO, USERNAME and EP ADDR for tunnel endpoint 450 will exist in the database because tunnel initiator 430 will have sent an update to database 110 after having established tunnel connection 456 to endpoint 450 for link 422. Endpoint database 110 will return a success message 496 containing the EP ADDR for tunnel endpoint 450 and tunnel initiator 440 will establish tunnel connection 466 with endpoint 450.

Tear-down of connections and clean up of entries in endpoint database 110 can occur in a variety of ways. Database entries may include a timestamp that provides for entries to be removed from the database after a pre-determined time period. Database entries may also be removed responsive to a tear-down message from the tunnel initiators or tunnel endpoint or, in the case of mobile IP, through a de-registration message. In the latter case, the message will include a unique tear-down message type along with an identifier for the database entry, such as the EDO/USERNAME combination or a mobile identification number (MIN).

The protocol according to the present invention supports the deterministic selection of an endpoint for connections having multiple origination points. Although the present invention is described in the context of an L2TP tunnel and a mobile connection, the present invention is applicable to any communications link where it is desirable to terminate connections from multiple origins to the same endpoint.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the messages of the message flow scenarios may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method for determining a tunnel endpoint in a communications system, the method comprising the steps of:
   receiving a connection request from a client;
   responsive to the connection request, querying a database for a database entry matching the client using predetermined identifying information, where the matching database entry will include an identifier for a tunnel endpoint;
   responsive to receiving a database reply including the identifier for the tunnel endpoint, establishing a connection for the client to the tunnel endpoint identified in the database reply; and
   responsive to not receiving a database reply:
      establishing a connection for the client to a locally determined tunnel endpoint, and
      updating the database to include a database entry that includes the predetermined identifying information for the client and an identifier for the locally determined tunnel endpoint;
   where the step of querying a database for a database entry matching the client includes querying a local database for the matching entry and, if none is found, querying a remote database, and
   where the step of querying a remote database further includes multicasting a message having a predetermined message identifier and the predetermined identifying information for the client.

2. The method of claim 1, where:
   the step of multicasting a message having a predetermined message identifier further includes multicasting the message having the predetermined message identifier a predetermined number of times in the absence of a database reply; and
   the step, responsive to not receiving a database reply, of establishing a connection for the client to a locally determined endpoint further includes waiting a predetermined time-out period after a last multicast of the predetermined number of times for multicasting before establishing the connection for the client to the locally determined endpoint.

3. The method of claim 2, where the step of updating the database to include a database entry that includes the predetermined identifying information for the client and an identifier for the locally determined endpoint further comprises multicasting a message having another predetermined message identifier and including the predetermined identifying information for the client and the identifier for the locally determined endpoint.

4. The method of claim 3, where the predetermined identifying information includes an EDO and a Username for the client.

5. The method of claim 4, where the identifier for the endpoint is a network address.

6. A network communication system, the system comprising:
   a database device configured to store a data entry, where the data entry is keyed by predetermined client identifying information and includes a tunnel endpoint identifier field, the database device being further configured to receive a database query that includes a client identifying information value, search for a matching data entry that matches the client identifying information value and, if the matching data entry is found, send a database reply that includes the value of the tunnel endpoint identifier field of the matching data entry;
   an initiator network device for receiving a call request from a client and, responsive thereto, generate a database query having the client identifying information value for the client from which the call request is received, and where the initiator network device is further configured, when a database reply corresponding to the database query for the calling client is received, to establish a connection to an tunnel network device corresponding to the endpoint identifier value included in the database reply and, when no database reply corresponding to the database query for the calling client is received, the network device is configured to locally select a locally determined endpoint value and establish a connection for the client to a network device corresponding to the locally determined endpoint value
   where the network device is further configured to generate the database query having the client identifying information value for the client from which the call request is received by sending a multicast message having a predetermined message type and the client identifying information value for the client from which the call request is received and where the database device is configured to search for the matching database entry responsive to receiving the multicast message having the predetermined message type.

7. The network communication system of claim 6, where the network device is further configured to determine that no database reply has been received by sending the multicast message having the predetermined message type a predetermined number of times without receiving the database reply within a predetermined time period.

8. The network communication system of claim 6, where:
   the network device is further configured to generate the database update by sending a multicast message having a predetermined message type along with the client identifying information value for the client from which the call request is received and the locally determined endpoint value; and
   the database device is configured to create the database entry having the client identifying information value for the client from which the call request is received and the locally determined endpoint value responsive to receiving the multicast message having the predetermined message type.

9. A network system for transmitting and receiving packets across a network, the network device comprising:

a database device coupled to the network and configured to receive a first predetermined type of message having a client identifier field and, responsive thereto, search for a database entry having a key field with a value matching a value of the client identifier field, where the database entry includes a tunnel endpoint address field and, when a corresponding database entry is found, generate a second predetermined type of message having the client identifier field that includes the value of the key field of the database entry and a tunnel endpoint field that includes a value of the tunnel endpoint address field of the database entry, and where the database device is configured to receive a third predetermined type of message having the client identifier field and the tunnel endpoint field and, responsive thereto, store a database entry corresponding to a value in the client identifier field of the third predetermined type of message and having a value of the tunnel endpoint field of the third predetermined type of message in the endpoint address field of the database entry;

a first network device coupled to the network and configured to receive a first call request from a client device and, responsive thereto, locally select a second network device coupled to the network and establish a first connection for the client device from the first network device to the second network device, where the first network device is also configured to generate the third predetermined type of message having a value corresponding to the client device in the client identifier field and an address value corresponding to the second network device in the tunnel endpoint field; and a third network device coupled to the network and configured to receive a second call request from the client device and, responsive thereto, generate the first predetermined type of message having the value corresponding to the client device in the client identifier field, and where the third network device is also configured to wait for a predetermined time period to receive the second predetermined type of message having a value of the client identifier field corresponding to the client device and, using the value of the tunnel endpoint field of the second predetermined type of message, establish a second connection to the second network device where the first predetermined type of message is a database query message, the second predetermined type of message is a database reply message, and the third predetermined type of message is a database update message.

\* \* \* \* \*